Aug. 20, 1974 K. F. FRANK 3,830,704

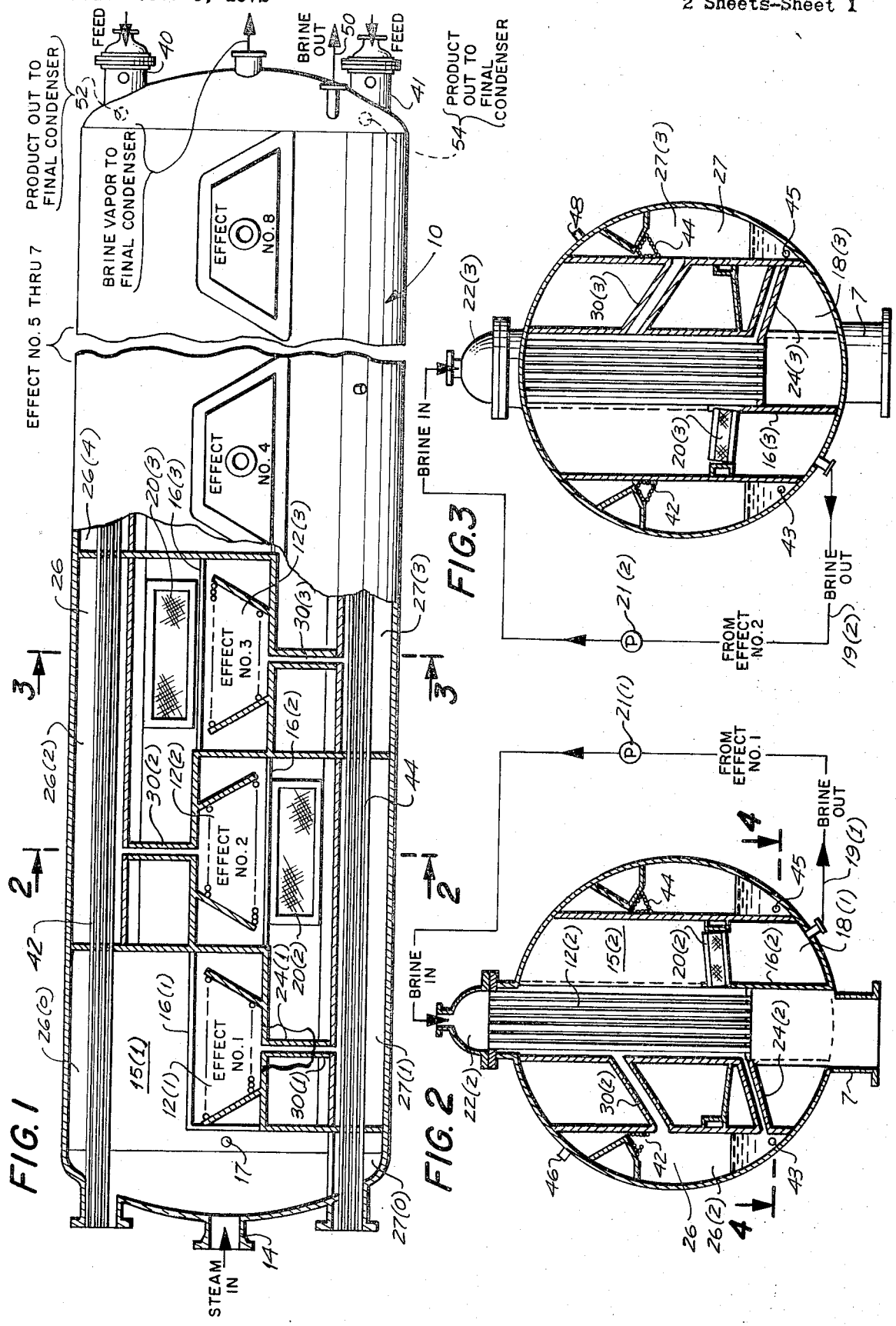

MULTIPLE EFFECT EVAPORATOR SYSTEM

Filed Oct. 6, 1972 2 Sheets-Sheet 2

United States Patent Office 3,830,704
Patented Aug. 20, 1974

3,830,704
MULTIPLE EFFECT EVAPORATOR SYSTEM
Kurt F. Frank, Pomona, Calif., assignor to Aerojet-General Corporation, El Monte, Calif.
Filed Oct. 6, 1972, Ser. No. 295,588
Int. Cl. B01d 1/22, 1/26, 3/00
U.S. Cl. 202—174                                   5 Claims

ABSTRACT OF THE DISCLOSURE

A multiple effect vertical tube evaporator system employing an elongated shell with a plurality of juxtapositioned and transversely-oriented effects characterized by alternatively-opposite, horizontal, transverse vapor flow in adjacent effects and positioned in the shell with each effect having a condensing side and an evaporating side to form a concentrate and a hot vapor with two longitudinally-extending, internally-disposed preheater compartments located respectively along opposite inside walls of the elongated shell. The two preheater compartments are each subdivided into several distinct preheater sections with each preheater section being associated with the condensing side of a single effect with means being provided for removing condensate and vapor from the condensing side of said single effect to the associated preheater section with alternate effects being connected to preheater sections of the opposing preheater compartments. A bundle of longitudinally-extending tubes is situated in each of the two preheater compartments for heating evaporator feed prior to its introduction into the multiple effect evaporator.

---

This invention relates to a multiple effect evaporator system wherein the evaporator and preheater are housed in a common vessel.

Heretofore, multiple effect evaporators have most commonly utilized individual evaporators located in separate vessels interconnected by a complex array of external piping carrying the various liquids and vapors from effect to effect. Insulation, structural support and piping requirements have rendered such multiple effect systems costly and relatively inefficient to operate. The feed preheater is customarily situated in an additional vessel, further necessitating an additional array of external piping for transport of fluids to and from the preheater vessel and the several evaporator units.

Many of the disadvantages of the prior art have been overcome to a substantial extent through use of the structure described in the copending application of Kurt F. Frank et al., Ser. No. 10,231, filed Feb. 10, 1970, now abandoned and succeeded by Ser. No. 299,933, filed Oct. 24, 1972, now Pat. No. 3,797,552, issued Mar. 19, 1974 for multiple effect evaporator, assigned to the same assignee as the instant patent application. In the aforementioned Frank et al. patent application, there is provided a multiple effect evaporator system wherein the liquid and vapors are forwarded from one effect to another in a single vessel; however, preheating of the feed to the evaporator is accomplished in a vessel separate from the unitized evaporator.

The system of the instant invention incorporates the feed preheater in the same vessel with the unitized evaporator, this being achieved in a structure of an advanced design which significantly reduces space requirement and minimizes heat loss. There is a substantial elimination of external piping which results in a substantial saving of heat energy and because of the unitized shop-built structure, there is a significant reduction of time and labor over that heretofore required in the field erection of a desalination plant at the construction site. By incorporating the feed heater into the unitized evaporator system, there is an elimination of a separate feed heater vessel and external piping attendant thereto.

In the improved evaporator system of the invention, the feed stream to the evaporator proper is advantageously divided into two fluid paths, each comprising a long tube bundle, which bundles are respectively located in separate preheater compartments along opposite inside walls of the elongated shell in which the unitized system is housed. With this arrangement each of the two preheater feed tube bundles is effectively heated in sequentially located preheater sections of a single preheater compartment by vapors from alternate evaporator effects. By heating each of the preheater tube bundles in succeeding sections with hot vapors from alternate effects, the temperature differential between the vapor and the feed is maximized in each preheater section of both compartments and this makes possible more effiecient heat transfer to the feed and, hence, reduced heat transfer surface, than would be possible say with a single large tube bundle heated sequentially by exhaust vapors from each of the succeeding effects in turn.

These and other advantages will be more fully understood from the following detailed description and the accompanying drawings, in which:

FIG. 1 is a fragmentary plan view, partially cutaway to more fully illustrate the intrastructure of the evaporator system, FIG. 2 is a cross-sectional view taken along line 2—2 of FIG. 1;

FIG. 3 is a cross-sectional view taken along line 3—3 of the next succeeding effect to that illustrated in FIG. 2—2;

Figure 4:
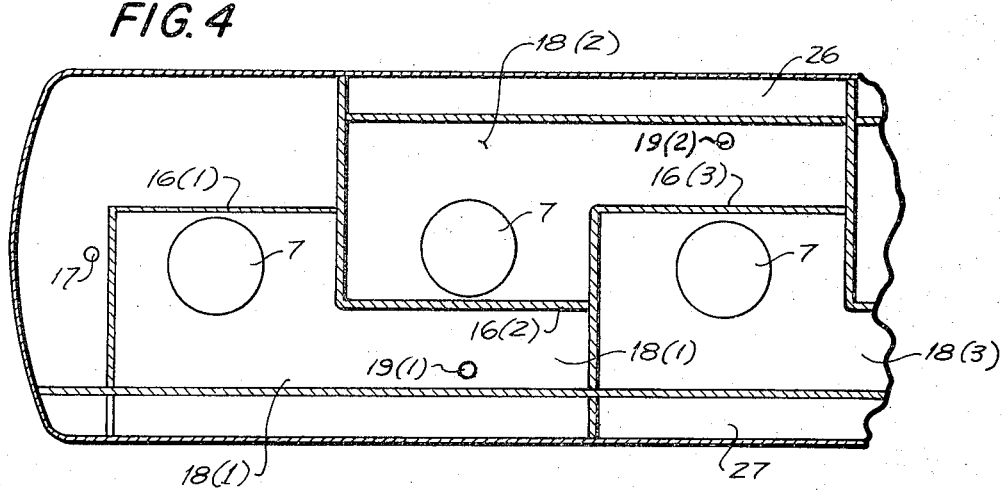
FIG. 4 is a fragmentary horizontal sectional view taken along line 4—4 of FIG. 2.

With reference to the drawings, there is illustrated an evaporator system comprising eight (8) effects housed in a cylindrical vessel 10. The stream undergoing evaporation, typically, brackish water or seawater is introduced to the upper ends of the vertical tubes of bundle 12(1) of the first effect. The tube bundles illustrated in the particular embodiment of FIG. 1 have a trapezoidal horizontal section with the flow path of the heating vapor decreasing in direction of flow therethrough. The steam or hot vapor for heating the vertical tubes of effect no. 1 is introduced to one end of the cylindrical vessel 10 through an axially-located line 14 with the steam entering first into a vapor chest 15(1) from whence, the steam flows in a transverse direction of the vessel 10 over the upper edge of a vertical wall 16(1), entering the tube bundle 12(1) and thus, providing heat for the brackish water or seawater flowing down the interior walls of the several tubes. Wall 16(1) reaches to the inside bottom of the cylindrical vessel 10 and provides a liquid barrier between a liquid sump and the vapor chest 15(1). Some of the steam of the vapor chamber 15(1) engages preheater tube bundles 42 and 44 hereinafter described in the adjoining preheater areas 26(0) and 27(0) where the steam condenses and provides heat to the feed flowing therethrough. The condensate from the common areas 26(0) and 27(0) is collected and returned via line 17 to the boiler. As best seen in FIG. 4, the lower ends of the several tubes of the vertical tube bundle 12(1) empty into a sump area 18(1) having a rough L-shaped configuration. The stream being processed collects in the sump 18(1) where it separates into concentrate (brine) and concentrate vapor (brine vapor). It will be appreciated that the interior of the tube bundle 12(1) and the sump 18(1) comprise the evaporating side of effect no. 1. The condensing side of effect no. 1 includes the vapor chest 15(1), and the vapor flow path through the tube bundle 12(1). The steam introduced from the vapor chest 15(1) into the transverse vapor flow path of the tube bundle 12(1) condenses on the several tubes and gives up heat for evaporation of a portion of the seawater or brackish water flowing down the interior of the several tubes of the bundle 12(1). The brine vapor generated in the interior of the several tubes of tube bundle 12(1) upon being separated from the concentrate of sump 18(1) provides the heating fluid in the next succeeding effect no. 2.

As best seen in FIGS. 1 and 2, the brine vapor of sump 18(1) passes upwardly through a horizontally-disposed, elongated liquid-vapor filter 20(2) and enters vapor chest 15(2) of the second effect. From the vapor chest 15(2) the vapor passes over the upper end of the vertical wall 16(2) into the condensing side of the vertical tube bundle 12(2) of effect no. 2. The brine or concentrate from the previous effect no. 1 is passed in a line 19(1) via pump 21(1) to brine chest 22(2) of the second effect. Typically, each of the tubes of the tube bundle 12(2) is provided with a nozzle (not illustrated) through which the concentrate passes to the interior of each of the respective tubes with some vaporization there occurring because of pressure drop. There may be also some vaporization occurring due to a pressure change with the introduction of the concentrate into the brine chest 22(2) from line 19(1). As before, the concentrate flows down the interior of the respective vertical tubes of bundle 12(2) with heat being transferred through the tube walls. The vapor condensing on the exterior of the tubes collects as condensate at the base of the tube bundle 12(2) and is removed in a condensate removal line 24(2) to an outwardly lying preheater section 26(2). Uncondensed vapor and non-condensibles exiting from the converging vapor flow path of tube bundle 12(2) of the condensing side of effect no. 2 are passed by a short conduit 30(2) to the vapor space of the outlying aforementioned preheater section 26(2).

As described in connection with effect no. 1 the liquid and vapor out of the vertical tube bundle 12(2) collect in an underlying sump 18(2) with the generated brine vapor being separated from the concentrate through a horizontally-disposed filter 20(3) (FIG. 3) of the next succeeding effect. With respect to FIG. 3, the vapor passing through the filter 20(3) passes over the upper edge of the vertical wall 16(3) and continues in a transverse direction of the length of the cylindrical housing 10 through the converging vapor flow path of tube bundle 12(3) of effect no. 3. The vapor, for the most part, condenses on the vertical tubes of bundle 12(3), giving up heat through the wall to the downwardly-flowing concentrate film on the interior walls of the several tubes of bundle 12(3). The condensing vapor collects in a pool at the base of the tube bundle 12(3) and is transferred through a short internal conduit 24(3) to the outlying preheater section 27(3). As before, concentrate and brine vapor collect in an underlying sump 18(3) from whence the concentrate is removed and introduced via an external line and pump to the brine chest 22(4) of the succeeding effect no. 4.

The several preheater sections of the two opposing preheater compartments 26 and 27 each has an upper portion which serves as a steam chest and a lower portion providing a condensate reservoir. Bundles 42 and 44 of longitudinally-extending tubes are provided for carrying evaporator feed and are respectively situated in the two preheater compartments 26 and 27 with each bundle passing successively through the adjoining steam chest of the related preheater compartment.

The several succeeding effects operate as described above with an increasingly-concentrated brine being passed from the sump of the preceding effect to the brine chest of the next succeeding effect and similarly with the brine vapor generated in each preceding effect providing the heating media for the tubes of the next effect.

In the unitized evaporator-preheater vessel of the invention, the feed is advantageously split into two streams and heated respectively in two longitudinally-extending, internally-disposed preheater compartments 26 and 27 located respectively along opposite inside walls of the elongated shell. Each of the preheater compartments is subdivided into several distinct preheater sections with each preheater section being associated with the condensing side of a single effect with means being provided for removing condensate and vapor from the condensing side of that effect to the associated preheater section. For instance, as described above in connection with effect no. 2, the uncondensed vapor and non-condensibles and the condensate of effect no. 2 are removed in internal conduits 30(2) and 24(2) respectively, to the outlying associated preheater section 26(2) of compartment 26. Thus, it is seen the pressure of the condensing side of effect no. 2 is substantially the pressure of the outlying associated preheater section 26(2). Similarly, the non-condensibles and uncondensed vapor of effect no. 3 as well as the condensate of that effect are passed in internal conduits 30(3) and 24(3) respectively, to the outlying associated preheater section 27(3) of the preheater compartment 27. Upon reference to FIG. 1, it will be seen that the vapor flow through the condensing sections of adjacent effects are in opposite direction. Thus, the vapor flow through the condensing side of effect no. 2 is opposite in direction to the vapor flow through the condensing section of the next adjacent effect no. 3. Each of the two preheater compartments 26 and 27 are respectively provided with a longitudinally-containing bundle of tubes which extend in succession through the several preheater sections of the respective two compartments. With the foregoing arrangement including the opposite transverse vapor flow through adjacent effects, the two preheater feed tube bundles are most effectively heated in the sequentially-located preheater sections of the two respective preheater compartments by vapors from alternate evaporator effects. Thus, by heating each of the preheater tube bundles in succeeding preheater sections with hot vapors from alternate effects, the temperature differential between the vapor and the feed carried by the respective tube bundles is maximized for each preheater section. This arrangement to maximize the temperature differential between feed and heating vapor makes for more efficient heat transfer. The split feed streams are introduced to the respective tube bundles 42 and 44 of preheater compartments 26 and 27 bundle enclosures 40 and 41. As seen in the schematic flow diagram of FIG. 5, the feed streams are split at 31 and 32 and rejoined at the opposite end of the cylindrical vessel and introduced to the brine chest of effect no. 1.

The succeeding preheater sections of each of the preheater compartments 26 and 27 are connected to different individual effects and this being so, the conditions of the said preheater section differs from its adjacent sections in temperature and pressure. For instance, preheater section 26(2) which is associated with effect no. 2 has conditions differing from the next succeeding preheater section 26(4) which is associated with effect no. 4. The pressure and the condensate temperature of preheater section 26(2) will be greater than that of preheater section 26(4). This difference in conditions is utilized to bring about further transfer of heat to the feed tube bundle 42 of the elongated preheater compartment 26 to which both preheater sections 26(2) and 26(4) belong. As seen in the cross-sectional views of FIGS. 2 and 3 adjoining preheater sections of the respective preheater compartments 26 and 27 are connected respectively through submerged orifices 43 and 45. The submerged orifices 43 and 45 permit transfer and flashing of condensate between adjoining preheater sections. It will be appreciated that with such flashing, condensate vapors are generated which are available for transferring heat to the tube bundle passing through the respective section. The condensate vapor in contacting the tube bundle segment condenses, transferring heat through the walls of the tubes to the feed flowing therethrough and, of course, forming condensate which falls into the condensate pool therebelow. While in the preferred embodiment illustrated in the drawings, an orifice is provided for transfer of condensate between adjacent preheater sections, it will be appreciated that the transfer could be accomplished by external piping whereby condensate would be removed, for example, from the condensate pool of preheater section 26(2) and passed through external piping to the adjacent preheater section 26(4).

While the particular embodiment illustrated in the drawings employs vertical tube bundles, wherein the concentrate or brine flows downwardly under the influence of gravity in the tubes of the several tube bundles, it will be understood that the percolating effect utilized in upflow vertical tube evaporators would operate equally effectively for transfer and evaporation of brine in the several effects of the evaporator. The upflow vertical tube technology is well known and will not be further described herein. The concept of invention is applicable to either form of vertical tube evaporators.

It will be seen in FIGS. 2 and 3 that the longitudinally-extending preheater tube bundles 42 and 44 of the elongated preheater compartments 26 and 27, each comprise in vertical cross-section a general trapezoidal configuration with the vapor flow path therethrough converging in a generally upward direction. It will be appreciated that with this arrangement the rate of vapor flow is substantially constant across the depth of the respective two tube bundles. The non-condensibles are removed from the several sections of the respective preheater compartments 42 and 44 through removal lines 46 and 48.

Figure 5:
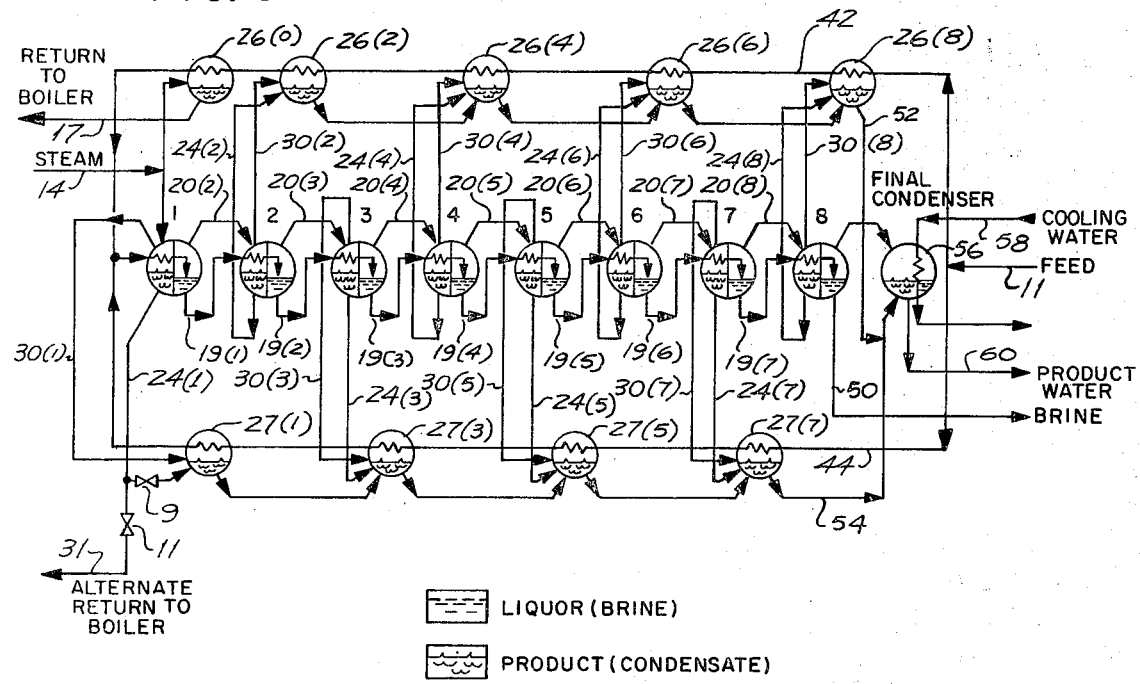
FIG. 5 is a schematic flow diagram of the evaporator system illustrated in the preceding FIGS. 1–4.

The overall operation of the unitized evaporator-preheater of the invention is best understood with reference to the schematic flow diagram of FIG. 5, together with longitudinal sectional view of FIG. 1 where it is seen that the seawater feed or other stream 11 being processed is split into two streams and passed through the elongated preheater tube bundles 42 and 44 of preheater compartments 26 and 27 respectively. The seawater of the split streams 42 and 44 are combined after lengthwise passage through the respective preheater compartments and introduced to the brine chest of effect no. 1 from whence the feed stream passes into the interior of the several vertical tubes of the tube bundle 12(1) of that effect. Steam is introduced via line 14 into the vapor chest 15(1) of the first effect from where it flows in a transverse direction (FIG. 1) through the vapor space of the condensing side of the tube bundle 12(1). The steam condensing on the several vertical tubes of effect no. 1 is removed as steam condensate via line 24(1) (FIG. 5) to the associated outlying preheater section 27(1) of the preheater compartment 27 through which the elongated tube bundle 44 passes. Alternately, part or all of the condensate of line 24(1) may be returned via line 31 to the boiler by proper setting of valves 9 and 11. The uncondensed vapor and noncondensibles are passed in an internal line 30(1) (FIG. 5) to the same preheater section 27(1) where the removed steam of line 30(1) condenses on the segment of the preheater tube bundle 44 in that preheater section. The steam condensing on the tube bundle segment 44 falls into the condensate pool of preheater section 27(1). The seawater concentrate and concentrate vapor out of the vertical tube bundle 12(1) of effect no. 1 collects in a sump therebelow from whence the brine vapor passes through a vapor-liquid filter 20(2) and enters the condensing side of effect no. 2 where it provides the heating medium for the tube bundle of that effect. The concentrate out of the sump of effect no. 1 is passed in a line 19(1) to the brine chest of effect no. 2 from whence it flows into the interior of the several tubes of tube bundle 12(2) of that effect. It will be seen that the exhaust vapors and non-condensibles from the condensing side of effect no. 2 are removed in an internal line 30(2) to the associated preheater section 26(2) of preheater compartment 26. The condensate formed in effect no. 2 is passed in an internal line 24(2) to the same preheater section 26(2).

The foregoing mode of operation of the two preceding effects nos. 1 and 2 is repeated in the following six effects nos. 3–8 with the uncondensed vapor and condensate of such succeeding effect being transferred to a different preheater section of preheater compartments 26 and 27, respectively. The several preheater sections of the two preheater compartments 26 and 27 operate under different temperatures and pressures. Additionally heat is extracted from the condensate product of the two preheater compartments by passage of condensate from section to section of the two respective compartments via orifices 43 and 45. The introduction of condensates from a preceding preheater section to a succeeding lower pressure preheater section results in evaporation of some of the introduced condensate which condensate vapor then transfers a further quantity of heat to the preheater feed by condensing upon the tube bundle segment passing through the respective preheater section.

In the schematic flow diagram of FIG. 5, the discharge brine from the system is removed from the sump of effect no. 8 in a line 50. The condensate products of the two preheater compartments 26 and 27 are removed in lines 52 and 54 respectively, combined and introduced to a final condenser 56 which is at a lower pressure than either preheater sections 26(8) and 27(7). The combined product condensate stream entering the final condenser 56 flashes and the flashed condensate is heat exchanged against a seawater coolant stream 58. The final condensate product stream is removed from the condenser 56 in a line 60. In the unitized preheater-evaporator of FIG. 1, the final condenser has not been incorporated therein. However, it will be appreciated that the final condenser 56 could be advantageously included within the cylindrical shell 10 immediately beyond the final effect no. 8.

In the system illustrated in FIG. 1, the condensate collecting on the base header of the tube bundle 12(1) of effect no. 1 is removed to the preheater section 27(1), along with the exhaust vapor and non-condensibles from the condensing side of effect no. 1. In an alternative embodiment, the condensate of effect no. 1 is combined with the condensate forming on the tube bundle segments of the preheater areas 26(0) and 27(0). Man-holes 7 of the several effects may be opened to provide access to the respective tube bundles.

What is claimed is:

1. In a multiple effect vertical tube evaporator system having a horizontally elongated shell closed at its opposite ends with a plurality of effects of successively lower pressures being axially juxtapositioned and with transverse vapor flow in each effect in the shell with each effect having a condensing side and an evaporating side lying on opposite sides of vertical tubes of a tube bundle for heating and vaporizing a liquid to form a concentrate and a hot vapor which vapor is condensed on the condensing side of the next lower pressure subsequent effect, thus providing a condensate, and having provision for transferring concentrate from a prior effect to the evaporating side of the vertical tubes of the next adjacent effect with respect to liquor flow to obtain a still further concentrate, and provision for causing vapor flow in alternately opposite horizontal transverse directions across the condensing sides of the tube bundles of adjacent effects, the improvement comprising two longitudinally-extending, internally-disposed preheater compartments located respectively along opposite inside walls of the elongated shell, said preheater compartments being subdivided into several distinct preheater sections with each preheater section being associated with the condensing side of a single effect and having an upper portion serving as a steam chest and a lower portion as a condensate reservoir and means for removing condensate from the condensing side of said single effect to the condensate reservoir of the associated preheater section and means for withdrawing uncondensed vapor from the condensing side of said single effect to the steam chest of said associated preheater section, a bundle of longitudinally-extending tubes for transporting evaporator feed situated in each of the two preheater compartments and passing successively through the adjoining steam chests of the respective preheater compartments, means for removing condensate from each of the several preheater sections of the two preheater compartments.

2. A multiple effect evaporator system in accordance with claim 1 wherein condensate removed from a preheater section of one of the preheater compartments is introduced to the next lower pressure subsequent preheater section of that preheater compartment.

3. A multiple effect evaporator system in accordance with claim 1 wherein the steam chest encomprising the bundle of tubes running through the several preheater sections of the respective preheater compartments decreases in cross-section in direction of vapor flow therethrough.

4. A multiple effect evaporator system in accordance with claim 1 wherein condensate is transferred from a preheater section of a respective compartment to the next lower pressure subsequent section of that compartment through an orifice in a wall separating said adjacent preheater sections.

5. A multiple effect evaporator system in accordance with claim 1 where the elongated shell is cylindrical.

References Cited
UNITED STATES PATENTS

| | | | |
|---|---|---|---|
| 2,782,150 | 2/1957 | Stalcup | 203—11 X |
| 3,146,177 | 8/1964 | Chalmers et al. | 202—173 X |
| 3,174,914 | 3/1965 | Worthen et al. | 203—10 X |
| 3,192,132 | 6/1965 | Loebel | 203—11 X |
| 3,303,106 | 2/1967 | Standiford Jr. | 203—27 |
| 3,532,152 | 10/1970 | Cartinhour | 202—174 |
| 3,684,661 | 8/1972 | Barba et al. | 203—11 |
| 3,713,989 | 1/1973 | Bom | 159—2 MS X |
| 3,697,383 | 10/1972 | Weaver | 159—Dig. 8 |

JACK SOFER, Primary Examiner

U.S. Cl. X.R.

159—13 A, 17 C, 46, Dig. 8; 203—11